United States Patent
Ishige

(10) Patent No.: US 11,237,819 B2
(45) Date of Patent: Feb. 1, 2022

(54) PROGRAM TRANSFER SYSTEM PERFORMING MACHINE LEARNING FOR PRECEDING ROBOTIC WORK DATA AND ROBOT SYSTEM HAVING THE PROGRAM TRANSFER SYSTEM

(71) Applicant: Seiko Epson Corporation, Tokyo (JP)

(72) Inventor: Taro Ishige, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/940,467

(22) Filed: Jul. 28, 2020

(65) Prior Publication Data
US 2021/0034353 A1 Feb. 4, 2021

(30) Foreign Application Priority Data

Jul. 29, 2019 (JP) .............................. JP2019-138615

(51) Int. Cl.
*G06F 8/65* (2018.01)
*G06N 5/04* (2006.01)
*G06N 20/00* (2019.01)
*B25J 9/16* (2006.01)

(52) U.S. Cl.
CPC .............. *G06F 8/65* (2013.01); *B25J 9/1658* (2013.01); *G06N 5/04* (2013.01); *G06N 20/00* (2019.01)

(58) Field of Classification Search
CPC ... G06F 8/65; G06N 5/04; G06N 20/00; B25J 9/1658; B25J 9/1661; G05B 2219/40053; B65G 47/905
See application file for complete search history.

(56) References Cited

U.S. PATENT DOCUMENTS

| | | | |
|---|---|---|---|
| 6,463,360 B1* | 10/2002 | Terada | G05B 19/41845 700/257 |
| 10,545,497 B1* | 1/2020 | Cui | G05D 1/0221 |
| 2013/0132945 A1* | 5/2013 | Anderson | G06F 8/65 718/1 |
| 2014/0047435 A1* | 2/2014 | Urbach | G06F 9/44589 717/178 |
| 2017/0028562 A1* | 2/2017 | Yamazaki | B25J 9/1697 |
| 2018/0079076 A1* | 3/2018 | Toda | G06N 3/08 |

(Continued)

FOREIGN PATENT DOCUMENTS

| CN | 108693851 A | 10/2018 |
|---|---|---|
| CN | 208494999 U | 2/2019 |

(Continued)

*Primary Examiner* — Daxin Wu
(74) *Attorney, Agent, or Firm* — Harness, Dickey & Pierce, P.L.C.

(57) ABSTRACT

A program transfer system includes: a communication unit communicating with a robot and outputting a result of the communication; a determination unit checking a work program provided in the robot, based on the result of the communication, and determining whether to import a different target work program from the work program or not; a program import unit importing the target work program to the robot when the determination unit determines the importing; a collection unit collecting work data of complete work from the robot; and a program update unit performing machine learning using the work data collected by the collection unit, and updating the target work program, based on a result of the machine learning.

12 Claims, 8 Drawing Sheets

(56) References Cited

U.S. PATENT DOCUMENTS

2018/0281180 A1    10/2018  Yamamoto et al.
2020/0167687 A1*    5/2020  Gene ..................... G06N 3/006

FOREIGN PATENT DOCUMENTS

| JP | H08-174356 A | 7/1996 |
| JP | H11-110027 A | 4/1999 |
| JP | 2001-121461 A | 5/2001 |
| JP | 2005-246543 A | 9/2005 |
| KR | 102212352 B1 * | 10/2018 |

* cited by examiner

FIG. 8
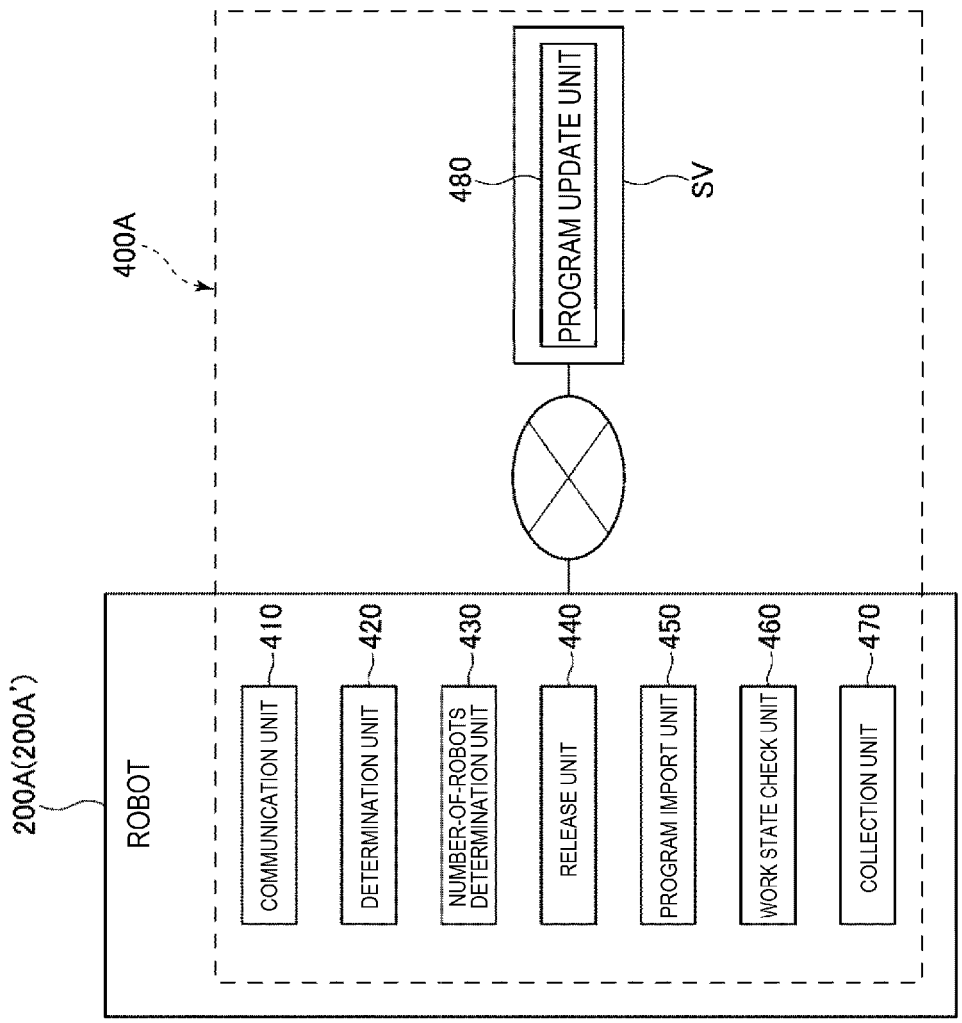
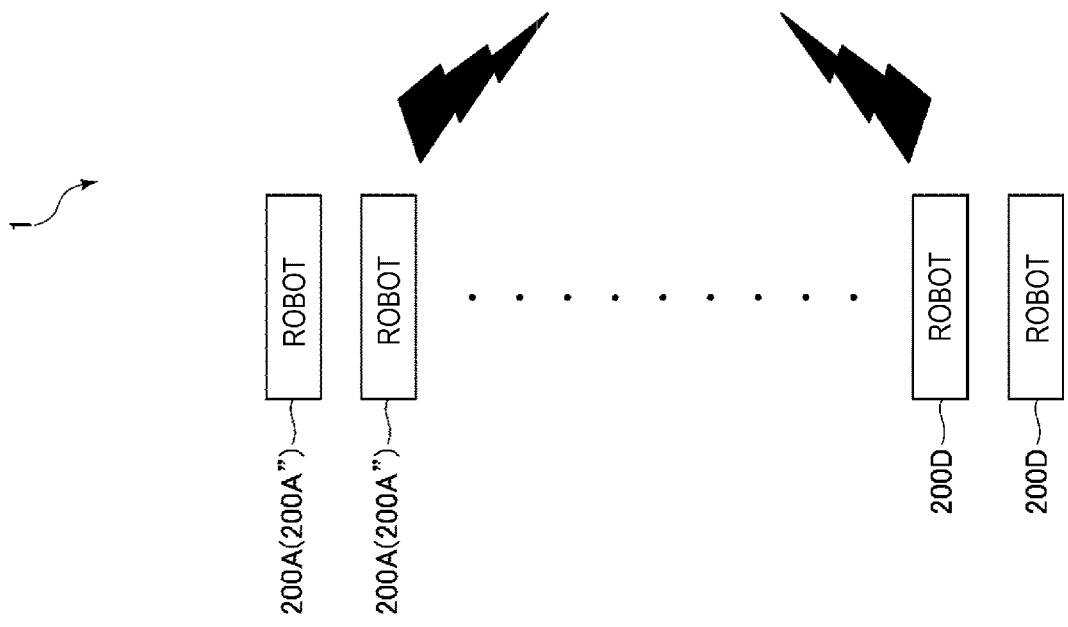

PROGRAM TRANSFER SYSTEM PERFORMING MACHINE LEARNING FOR PRECEDING ROBOTIC WORK DATA AND ROBOT SYSTEM HAVING THE PROGRAM TRANSFER SYSTEM

The present application is based on, and claims priority from JP Application Serial Number 2019-138615, filed Jul. 29, 2019, the disclosure of which is hereby incorporated by reference herein in its entirety.

BACKGROUND

1. Technical Field

The present disclosure relates to a program transfer system and a robot system.

2. Related Art

JP-A-11-110027 discloses an industrial robot automatically determining and importing a necessary part of a control program when its purpose of use is changed or when the version of the control program is changed.

However, when the work for the robot is diversified, the control program increases in terms of types and the amount of data. This may complicate the update work as described above and may cause an improper control program to be imported.

SUMMARY

A program transfer system according to an aspect of the present disclosure includes: a communication unit communicating with a robot and outputting a result of the communication; a determination unit checking a work program provided in the robot, based on the result of the communication, and determining whether to import a different target work program from the work program or not; a program import unit importing the target work program to the robot when the determination unit determines the importing; a collection unit collecting work data of complete work from the robot; and a program update unit performing machine learning using the work data collected by the collection unit, and updating the target work program, based on a result of the machine learning.

BRIEF DESCRIPTION OF THE DRAWINGS

FIG. 8 is a block diagram showing the configuration of a robot system according to a second embodiment.

DESCRIPTION OF EXEMPLARY EMBODIMENTS

The program transfer system and the robot system according to the present disclosure will now be described in detail, based on embodiments shown in the accompanying drawings.

First Embodiment

Figure 1:
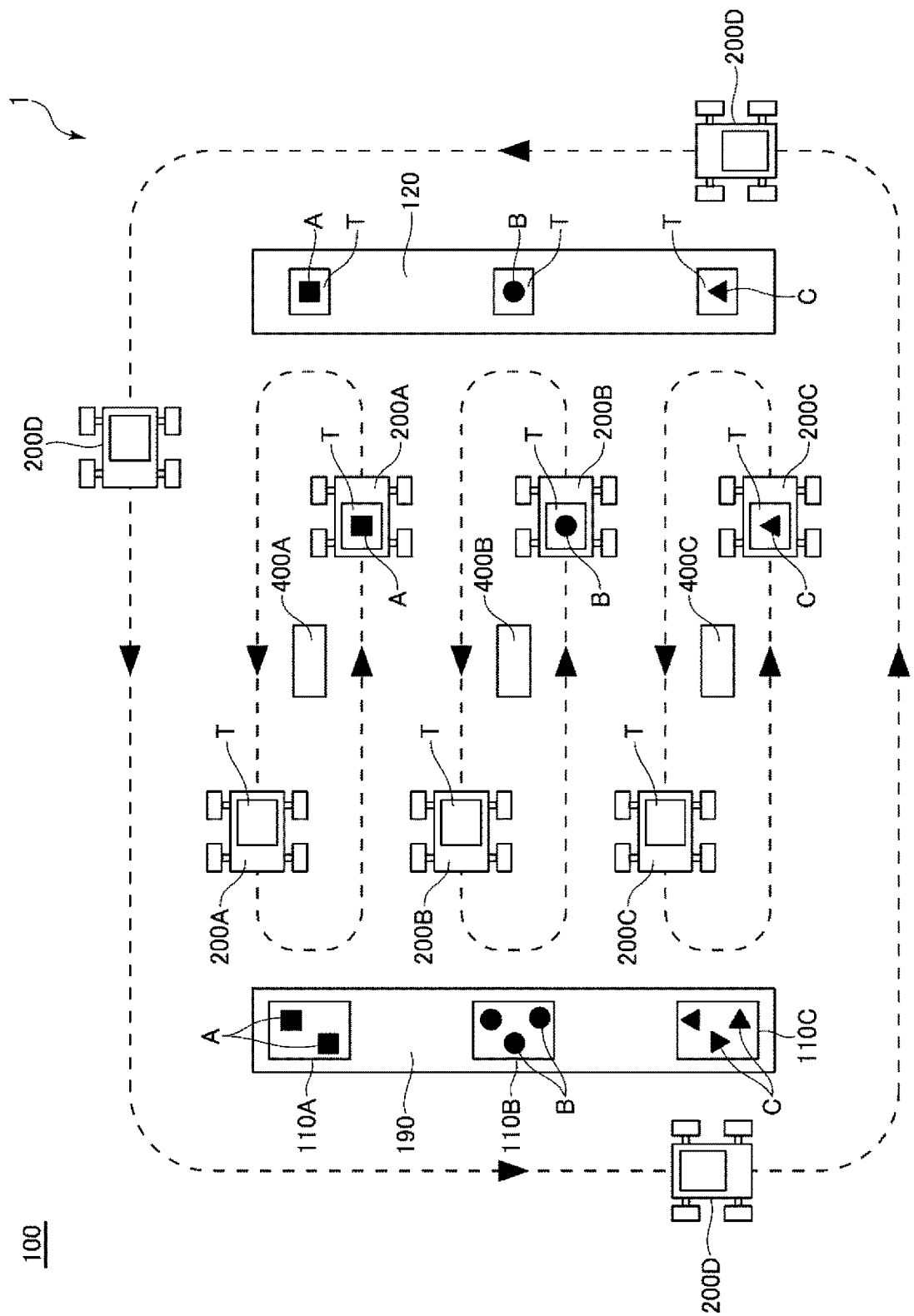
FIG. 1 shows the overall configuration of a robot system according to a first embodiment.
Figure 2:
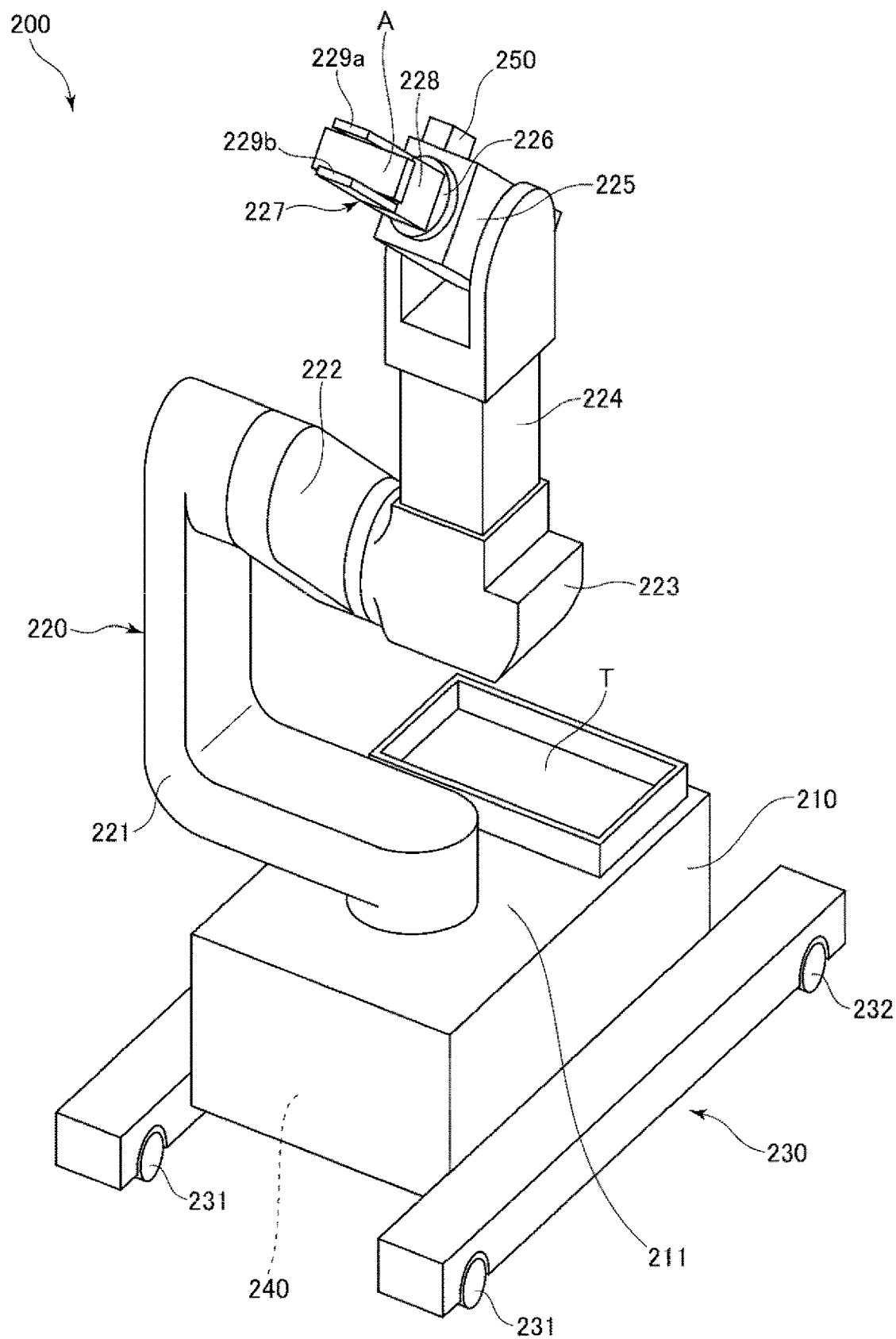
FIG. 2 is a perspective view showing an example of the robot.
Figure 3:
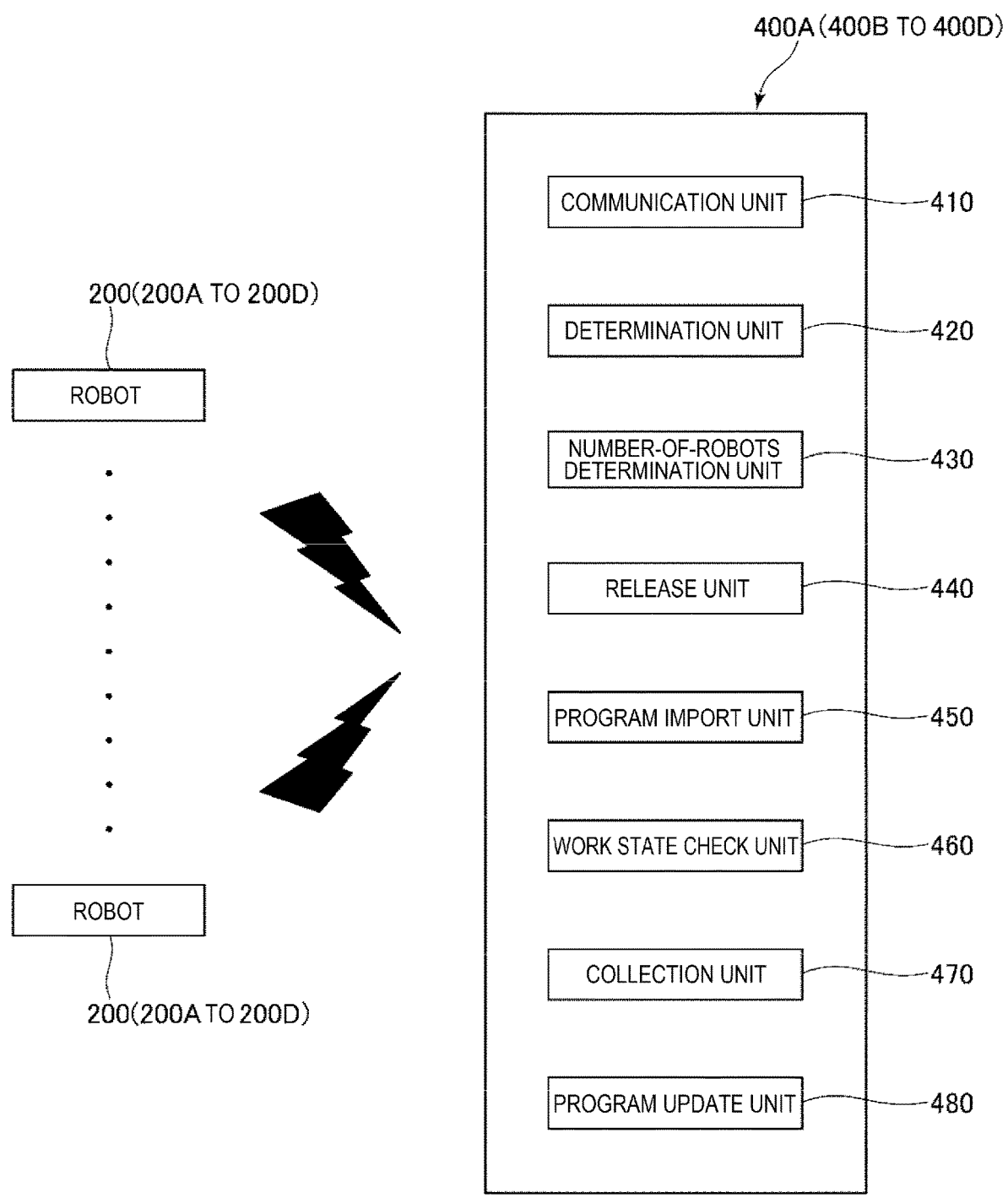
FIG. 3 is a block diagram showing the configuration of a work management controller.
Figure 4:
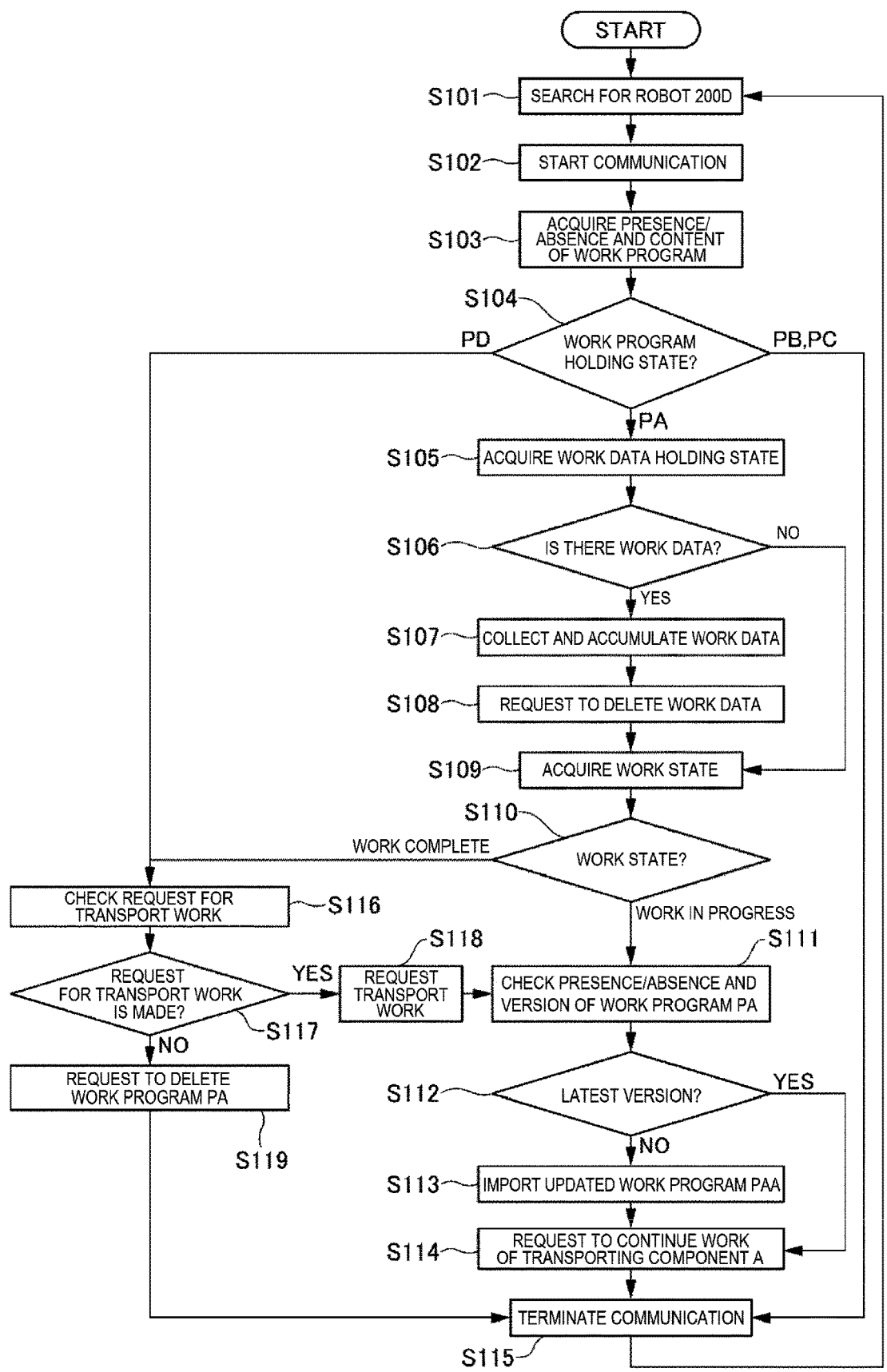
FIG. 4 is a flowchart illustrating processing by the work management controller.
Figure 5:
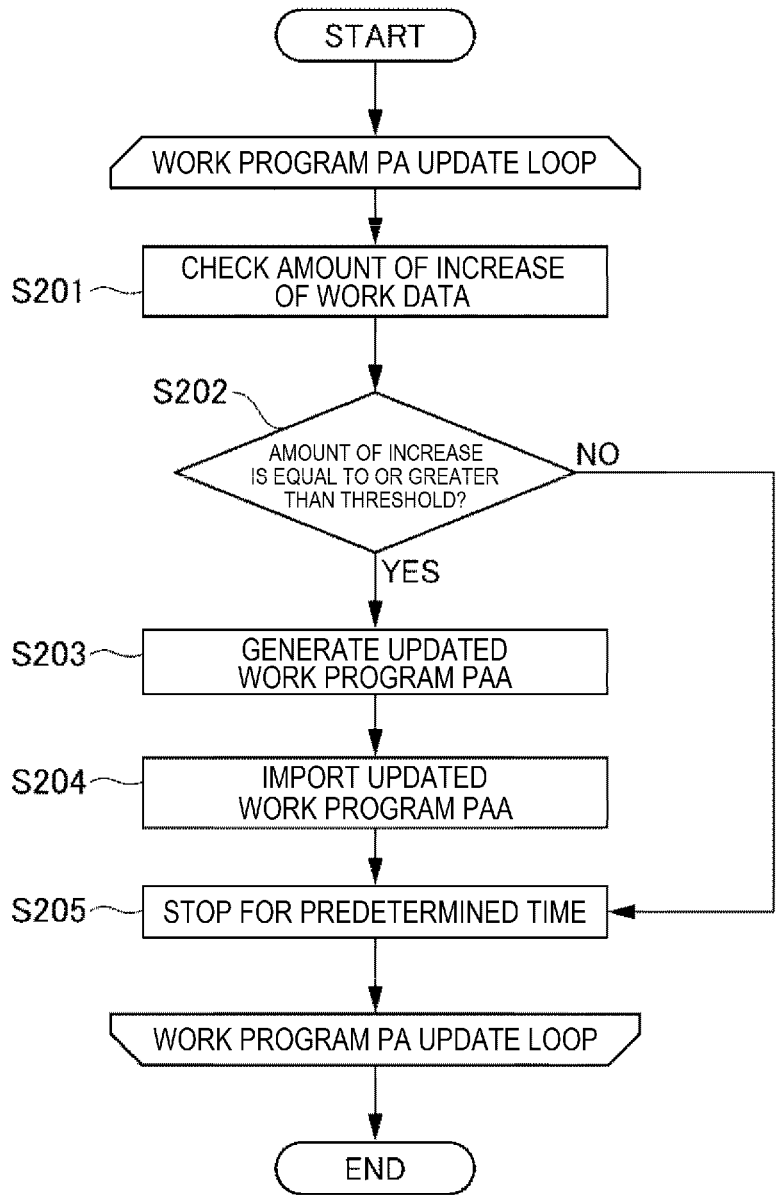
FIG. 5 is a flowchart illustrating update work for a work program.
Figure 6:
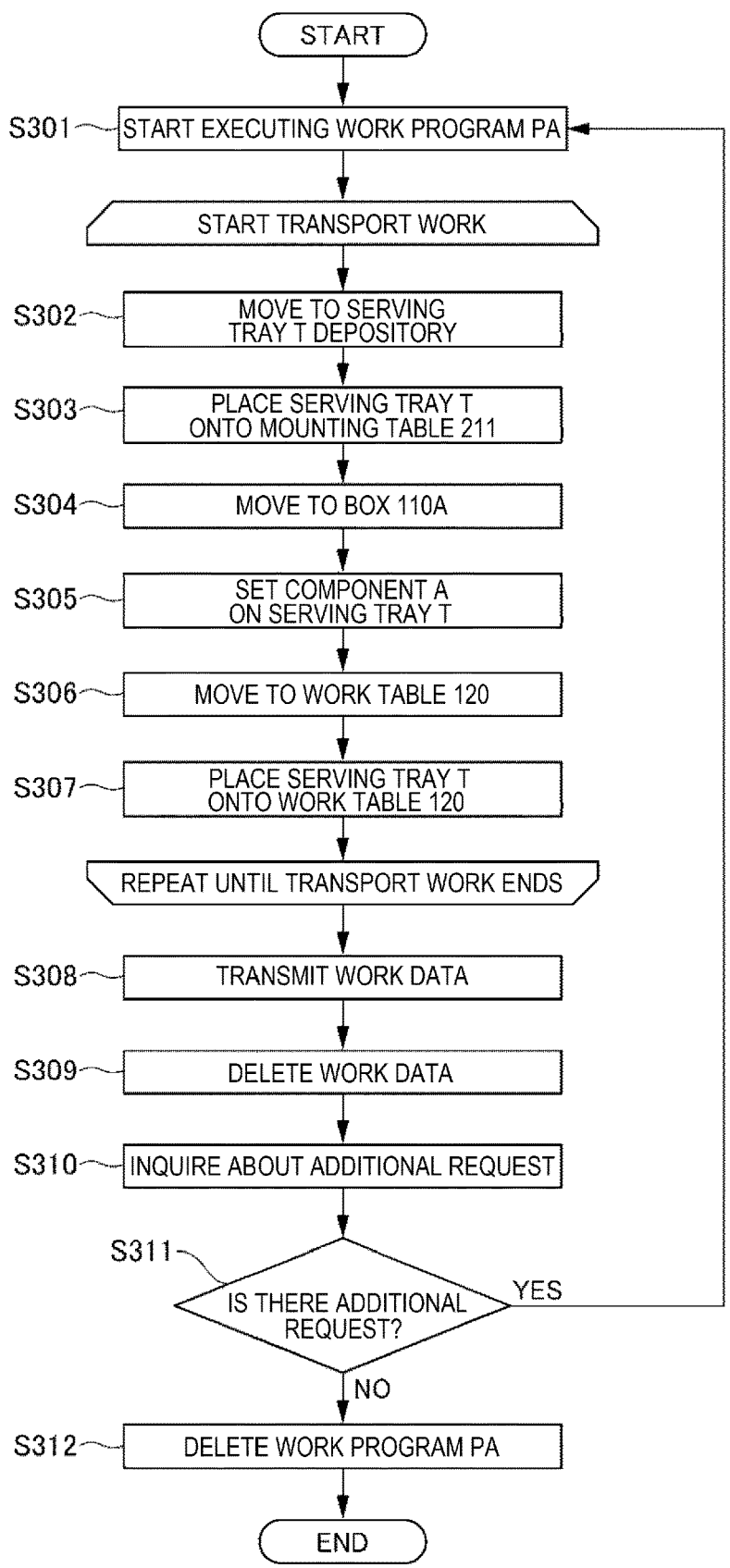
FIG. 6 is a flowchart illustrating the operation of the robot.
Figure 7:
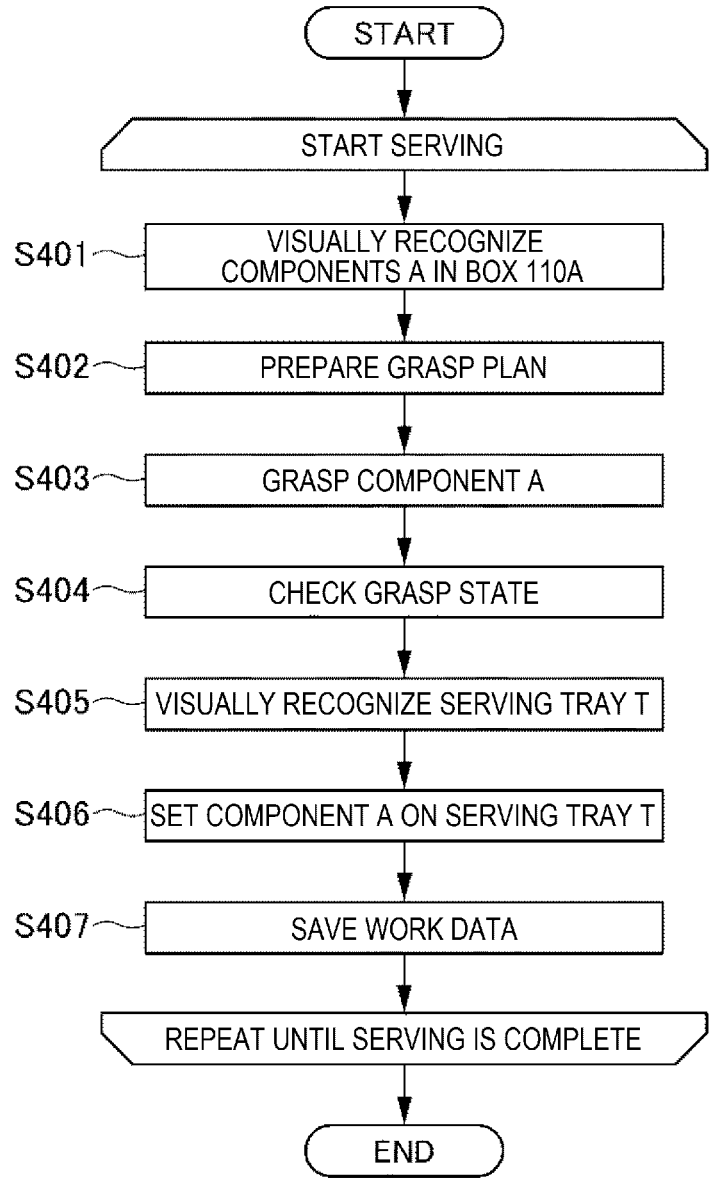
FIG. 7 is a flowchart illustrating component grasp work by the robot.

FIG. 1 shows the overall configuration of a robot system according to a first embodiment. FIG. 2 is a perspective view showing an example of the robot. FIG. 3 is a block diagram showing the configuration of a work management controller. FIG. 4 is a flowchart illustrating processing by the work management controller. FIG. 5 is a flowchart illustrating update work for a work program. FIG. 6 is a flowchart illustrating the operation of the robot. FIG. 7 is a flowchart illustrating component grasp work by the robot.

A robot system 1 is used, for example, at an industrial plant 100. On a shelf 190 in the industrial plant 100, for example, a box 110A untidily accommodating components A, a box 110B untidily accommodating components B, and a box 110C untidily accommodating components C are laid out. In a work area in the industrial plant 100, a plurality of robots 200A performing bin picking to pick up a component A from the box 110A and transporting the component A to a work table 120, a plurality of robots 200B performing bin picking to pick up a component B from the box 110B and transporting the component B to the work table 120, and a plurality of robots 200C performing bin picking to pick up a component C from the box 110C and transporting the component C to the work table 120, autonomously work.

In the industrial plant 100, a plurality of robots 200D move around outside the work area or stand by at a predetermined position so that the robot 200D can be used to assist any work behind schedule. That is, the robot 200D is a spare robot assisting the robots 200A to 200C. When the transport of the component A is behind schedule, the robot 200D works with the robot 200A to assist the transport of the component A. When the transport of the component B is behind schedule, the robot 200D works with the robot 200B to assist the transport of the component B. When the transport of the component C is behind schedule, the robot 200D works with the robot 200C to assist the transport of the component C. On finishing its role, the robot 200D goes back to move around outside the work area in the industrial plant 100 again or stands by at a predetermined position.

However, the place where the robot system 1 is applied and the work performed by the robot in the industrial plant are not particularly limited. For example, the work performed by the robot may be assembling, cleansing, inspecting, testing the components A, B, C, or the like.

The robots 200A to 200D are self-propelled robots. The robots 200A to 200D are not limited to any particular configuration and can be configured to be suitable for transport of a component or other types of work. In this embodiment, the robots 200A to 200D have similar configurations. Therefore, in the description below, the configuration of the robot 200A is described as a representative example and the description of the other robots 200B to 200D is omitted.

As shown in FIG. 2, the robot 200A has a base 210 having a mounting table 211, a robot arm 220 provided at the base 210, a moving mechanism 230 provided at the base 210, and a robot control device 240 controlling the driving of the robot arm 220 and the moving mechanism 230.

The robot 200A repeats work of placing a serving tray T onto the mounting table 211, moving to the box 110A by the moving mechanism 230, picking up a component A from the box 110A by the robot arm 220, setting the picked-up component A on the serving tray T placed at the mounting table 211, moving to the work table 120 by the moving mechanism 230, picking up the component A placed at the mounting table 211, and placing the picked-up component A with the serving tray T onto the work table 120.

The moving mechanism 230 employs an automated driving system. The robot 200A automatically travels along a path designated in advance. The moving mechanism 230 has a pair of front wheels 231 for steering and a pair of rear wheels 232 for driving, provided at the base 210. Although not illustrated, the moving mechanism 230 also has various sensors such as an acceleration sensor detecting an acceleration applied to the robot 200 at the time of moving and a marker sensor detecting a marker that serves as a guide for a passage. The robot control device 240 controls the traveling of the robot 200, using the results of detection by the sensors. However, the configuration of the moving mechanism 230 is not particularly limited.

The robot arm 220 is a 6-axis articulated arm. That is, the robot arm 220 has a first arm 221 coupled to the base 210 in a pivotable manner, a second arm 222 coupled to the first arm 221 in a pivotable manner, a third arm 223 coupled to the second arm 222 in a pivotable manner, a fourth arm 224 coupled to the third arm 223 in a pivotable manner, a fifth arm 225 coupled to the fourth arm 224 in a pivotable manner, a sixth arm 226 coupled to the fifth arm 225 in a pivotable manner, and a hand 227 coupled to the sixth arm 226.

The configuration of the hand 227 is not particularly limited, provided that the hand 227 can grasp the component A. The hand 227 in this embodiment has a base 228 attached to the sixth arm 226 and a pair of pawls 229a, 229b provided at the base 228, and can grasp the component A between the pawls 229a, 229b. Alternatively, for example, the hand 227 may be configured to hold the component A between four pawls, or may be configured to grasp the component A by an air chuck, electrostatic chuck or the like.

The fifth arm 225 is provided with a camera 250 to visually recognize the component A. Based on an image acquired by the camera 250, the position and attitude of the component A untidily accommodated in the box 110A are detected. The hand 227 grasps the component A, based on the result of the detection.

Up to this point, the robot 200A has been described. In this embodiment, the robots 200A to 200D have the same configuration, as described above. However, this is not limiting. That is, at least one of the robots 200A to 200D may have a different configuration from the others. Particularly, the configuration of the hand 227 can be suitably varied among the robots 200A, 200B, 200C, according to the weight, shape, and material of the components A, B, C. Also, for example, the robots 200A may have different configurations from each other. The same applies to the robots 200B to 200D. Other configurations of the robots 200A to 200D may be, for example, a configuration having a horizontal articulated arm as the robot arm 220, a configuration having a plurality of robot arms 220 or the like, an AGV (automated guided vehicle) without having the robot arm 220, or a fixed or moving robot that does not have the moving mechanism 230 and therefore cannot autonomously move.

Back to FIG. 1, the robot system 1 is installed in the industrial plant 100 and has a work management controller 400A for managing the work of the robot 200A, a work management controller 400B for managing the work of the robot 200B, and a work management controller 400C for managing the work of the robot 200C. The work management controller 400A is installed communicatively with at least the robots 200A, 200D. The work management controller 400B is installed communicatively with at least the robots 200B, 200D. The work management controller 400C is installed communicatively with at least the robots 200C, 200D. In this embodiment, each of the work management controllers 400A, 400B, 400C is installed communicatively with all the robots 200A to 200D.

The work management controllers 400A to 400C have similar configurations. Therefore, in the description below, the work management controller 400A is described as a representative example and the description of the other work management controllers 400B, 400C is omitted for the sake of convenience of the description. Also, in the description below, the robots 200A to 200D may be collectively referred to simply as the "robots 200".

The work management controller 400A is formed of, for example, a computer, and has a processor (CPU) processing information, a memory communicatively coupled to the processor, and an external interface. Various programs executable by the processor are saved in the memory. The processor can read and execute the various programs or the like stored in the memory.

As shown in FIG. 3, the work management controller 400A forms a program transfer system and has a communication unit 410, a determination unit 420, a number-of-robots determination unit 430, a release unit 440, a program import unit 450, a work state check unit 460, a collection unit 470, and a program update unit 480.

The communication unit 410 has the function of communicating with the robots 200 and the other work management controllers 400B, 400C. The communication unit 410 searches for a robot 200 with which the communication unit 410 can communicate. The communication unit 410 communicates with this robot 200 and outputs the result of the communication. The communication unit 410 can also communicate with the robots 200B to 200D as well as the robot 200 performing the work of transporting the component A. Its communication measure is not particularly limited and can be, for example, a wireless communication system of Wi-Fi, Bluetooth (trademark registered) or the like. However, the communication unit 410 may be able to communicate at least the robot 200D in addition to the robot 200A. When the communication area of the communication unit 410 is limited to a part of the inside of the industrial plant 100, for example, the communication unit 410 may not constantly be able to communicate with the robots 200 and may be able to communicate temporarily with the robots 200 when these robots pass through the communication area.

The determination unit 420 checks what work program is used by each robot 200D coupled to the work management controller 400A via the communication unit 410. In this embodiment, each robot 200D performs work according to one of a work program PA for performing the work of transporting the component A, a work program PB for performing the work of transporting the component B, a work program PC for performing the work of transporting the component C, and a work program PD for moving around or standing by in the industrial plant 100. Therefore, the determination unit 420 checks which of the work programs PA, PB, PC, PD is used by each robot 200D that is the destination of communication. The determination unit 420 also checks version information of the work program. Thus, the work state of the robot 200D that is the destination of communication can be easily checked.

The determination unit 420 determines whether the work program PA needs to be imported to each robot 200D communicating via the communication unit 410 or not, that is, whether the current work program needs to be rewritten with the work program PA or not. That is, based on the result of the communication with the robot 200D outputted from the communication unit 410, it is determined whether the robot 200D performing work based on the other work programs PB, PC, PD than the work program PA needs to function as the robot 200A working based on the work program PA or not.

Specifically, the determination unit 420 first compares the transport work state for the component A, which is a management target of the work management controller 400A, with a work plan received from a host computer, not illustrated, and determines whether the work of transporting the component A is underway according to plan, earlier than planned, or later than planned. When the transport work state is according to the work plan or earlier than planned, there is no need to increase the robot 200A any more. Therefore, in this case, the determination unit 420 determines that the work program PA need not be imported to the robot 200D. Meanwhile, when the transport work state is later than planned by the work plan, the number of robots 200A needs to increase to speed up the work. Therefore, in this case, the determination unit 420 determines that the work program PA needs to be imported to at least one robot 200D so that the robot 200D assists the work of transporting the component A.

When the checked work program is the work program PA, the determination unit 420 checks the version information of the work program. PA and determines whether it is the latest version or not.

The number-of-robots determination unit 430 determines whether the number of robots 200A performing the work of transporting the component A is enough or not, based on the result of the determination by the determination unit 420. Specifically, when the determination unit 420 determines that the transport work state for the component A is according to plan, the number-of-robots determination unit 430 determines that the number of robots 200A is appropriate and need not be increased or decreased. However, when the determination unit 420 determines that the transport work state for the component A is underway earlier than planned, the number-of-robots determination unit 430 determines that the number of robots 200A is excessive and needs to be reduced. The number-of-robots determination unit 430 also finds how many robots 200A should be reduced to restore the transport work state according to the work plan. Meanwhile, when the determination unit 420 determines that the transport work state for the component A is later than planned, the number-of-robots determination unit 430 determines that the number of robots 200A is not enough and needs to be increased. The number-of-robots determination unit 430 also finds how many robots 200A should be increased to restore the transport work state according to the work plan. Having such a number-of-robots determination unit 430 enables accurate determination about whether the number of robots 200A is enough or not.

The release unit 440 releases at least one of the robots 200A from the work of transporting the component A when the number-of-robots determination unit 430 determines that the number of robots 200A is excessive, as described above. That is, the memory area in the robot 200A secured by the work program PA is released. The number of robots 200A released from the work of transporting the component A is based on the result of the determination by the number-of-robots determination unit 430. Specifically, the release unit 440 imports the work program PD to all of the excess robots 200A, that is, rewrites the work program PA with the work program PD to change all of these robots 200A into robots 200D. Thus, the robots 200D released from the work of transporting the component A can be assigned to assist other delayed work. This can make the entire work more efficient.

However, this example is not limiting. For example, when it is found via the communication with the work management controller 400B that the work of transporting the component B is later than planned by the work plan, the release unit 440 may import the work program PB to at least one robot 200A of the excess robots 200A to change this robot 200A into a robot 200B. Similarly, when it is found via the communication with the work management controller 400C that the work of transporting the component C is later than planned by the work plan, the release unit 440 may import the work program PC to at least one robot 200A of the excess robots 200A to change this robot 200A into a robot 200C. This can reduce the delay in the work of transporting the components B, C.

The program import unit 450 has the function opposite to the release unit 440. That is, the program import unit 450 causes one of the robots 200D to become a new robot 200A taking on the work of transporting the component A, when the number-of-robots determination unit 430 determines that the number of robots 200A is not enough. The number of robots 200D that are assigned to newly take on the work of transporting the component A is based on the result of the determination by the number-of-robots determination unit 430. Specifically, the program import unit 450 imports the work program. PA to all of the robots 200D covering the shortage, that is, rewrites the work program PD with the work program PA to change all of these robots 200D into robots 200A. When the number of robots 200D is not enough to cover the shortage of robots 200A, the program import unit 450 can change all the robots 200D into robots 200A.

However, this example is not limiting. For example, when it is found via the communication with the work management controller 400B that the work of transporting the component B is underway earlier than planned by the work plan, the program import unit 450 may import the work program PA to at least one of the excess robots 200B to change this robot 200B into a robot 200A. Similarly, when it is found via the communication with the work management controller 400C that the work of transporting the component C is underway earlier than planned by the work plan, the program import unit 450 may import the work program PA to at least one of the excess robots 200C to change this robot 200C into a robot 200A. Thus, for example, when the number of robots 200D is not enough, as described above, the robots 200B, 200C can cover the shortage.

The work state check unit 460 checks the current state of the robots 200D. Specifically, the work state check unit 460 checks: whether each robot 200D is currently working as a robot 200A performing the work of transporting the component A, and when that is the case, whether the work is in progress or complete; whether each robot 200D is currently working as a robot 200B performing the work of transporting the component B, and when that is the case, whether the work is in progress or complete; whether each robot 200D is currently working as a robot 200C performing the work of transporting the component C, and when that is the case, whether the work is in progress or complete; or whether each robot 200D is not performing any of these. Thus, the work state of each robot 200D can be grasped, and for example, the processing by the release unit 440 and the program import unit 450 becomes easier.

The collection unit 470 collects work data of complete work from each robot 200A and each robot 200D performing the work of transporting the component A, via the communication unit 410. The work data includes work success information, which is information about work that is successfully done according to an instruction, and work failure information, which is information about work that is not successfully done according to an instruction. The work failure information is not particularly limited and varies depending on the work content. In the case of this embodiment, for example, information such as a picked-up image of the component A by the camera 250, feature quantity recognized by image processing, misrecognition of the position and attitude of the component A, drop of the component A from the hand 227 during pickup, deviation from a designated route during movement, or drop of the component A during movement may be employed.

The collection unit 470 can transmit a delete request giving instruction to delete the collected work data to each robot 200A and each robot 200D performing the work of transporting the component A, via the communication unit 410. On receiving this request, the robot 200A and each robot 200D performing the work of transporting the component A delete the transmitted work data. Thus, the memory capacity necessary in the robot 200D can be restrained and duplicate collection of the same work data can be restrained. Also, the risk of leakage of the work data can be reduced.

The program update unit 480 generates an updated work program PAA such that the failed work is reduced or preferably eliminated, based on the work data collected by the collection unit 470. The method for generating the updated work program PAA is not particularly limited. However, machine learning can be preferably used. That is, preferably, the program update unit 480 takes in the work success information and the work failure information collected in a large amount, as sample data, analyzes the data, extracts a useful rule, criterion or the like to reduce work failure from the analyzed data, develops an algorithm of the work program PA, and thus generates the updated work program PAA.

As described above, the determination unit 420 checks the version information of the work program PA held by each robot 200A and each robot 200D performing the work of transporting the component A. Therefore, the program import unit 450 imports, via the communication unit 410, the updated work program PAA to the robot 200A and the robot 200D performing the work of transporting the component A whose work program PA is determined as not the latest version by the determination unit 420. That is, the program update unit 480 rewrites the work program PA with the updated work program PAA as the latest work program. This reduces the failed work by the robot 200A and the robot 200D performing the work of transporting the component A and can improve the efficiency and yield of the work of transporting the component A.

In the robot system 1, the collection of work data by the collection unit 470 and the generation of and rewriting with the updated work program PAA by the program update unit 480 are periodically repeated. Thus, the latest work program PA can be maintained in each robot 200A and each robot 200D performing the work of transporting the component A, and the work efficiency of each robot 200A and each robot 200D performing the work of transporting the component A is improved.

The program update unit 480 may generate an updated work program PAA common to all the robots 200A and all the robots 200D performing the work of transporting the component A, or may generate an updated work program PAA corresponding individually to each of the robots 200A and the robots 200D performing the work of transporting the component A. Although having the same configuration, the robots 200A and the robots 200D performing the work of transporting the component A have slightly different characteristics from one another. Therefore, generating an updated work program PAA corresponding individually to each of the robots 200A and the robots 200D performing the work of transporting the component A, and importing the updated work program PAA corresponding individually to each of the robots 200A and the robots 200D performing the work of transporting the component A, can reduce the failed work more effectively.

In the case of generating the updated work program PAA corresponding individually to each of the robots 200A and the robots 200D performing the work of transporting the component A, the updated work program PAA may be generated, solely based on the work data collected from the corresponding robot 200D. Using only the work data collected from the corresponding robot 200D in this way can generate the updated work program PAA specialized for this robot 200D. Meanwhile, the updated work program PAA may be generated using the work data collected from the other robots 200 (200A, 200D) in addition to the work data collected from the corresponding robot 200D. Generating the updated work program PAA using the work data collected from a plurality of robots 200 including the corresponding robot 200D in this way enables collection of a large amount of work data in a short period of time. Therefore, a large amount of learning is achieved and the updated work program PAA with higher accuracy can be generated accordingly. Also, the update cycle of the updated work program PAA can be reduced.

Up to this point, the configuration of the work management controller 400A has been described. In the program transfer system formed of such a work management controller 400A, machine learning is performed using the work data collected from the robot 200D itself, and the work program PA is updated based on the result of the machine learning. Therefore, the update work is easy and an appropriate work program PA can be imported to the robot 200D.

The robot 200D can switch between the work of transporting the component A, the work of transporting the component B, and the work of transporting the component C, in response to a request from the work management controllers 400A, 400B, 400C. Therefore, the robot 200D can assist work that is behind schedule and restore the work according to the work plan. This increases the work efficiency of the robot system 1. Also, a large number of robots 200D can be easily assigned to perform the work of transporting the component A, the work of transporting the component B, and the work of transporting the component C.

An example of processing by the work management controller 400A will now be described with reference to the flowchart shown in FIG. 4.

First, in step S101, the work management controller 400A searches for a robot 200D. Next, in step S102, the work management controller 400A starts communicating with the robot 200D found by the search. Next, in steps S103, S104, the work management controller 400A checks the presence/absence and content of a work program held by the robot 200D that has started communication.

When the robot 200D holds the work program PA, that is, when the robot 200D performs the work of transporting the component A to assist the robot 200A, the work management controller 400A in steps S105, S106 checks the work data holding state of the robot 200D. When the robot 200D holds work data, the work management controller 400A in step S107 collects and accumulates the work data from the robot 200D. Next, in step S108, the work management controller 400A requests the robot 200D to delete the collected work data.

Next, in steps S109, S110, the work management controller 400A checks the work state of the robot 200D (robot 200D performing the work of transporting the component A), specifically, whether the work is in progress or complete. When the work is in progress, the work management controller 400A in steps S111, S112 checks the presence/absence of the work program PA, and the version information of the work program PA when the work program PA is present.

When the version of the work program PA is not the latest version, the work management controller 400A in steps S113, S114 imports the updated work program PAA to the robot 200D performing the work of transporting the component A and requests the robot 200D to continue the work of transporting the component A. Then, the work management controller 400A in step S115 terminates the communication with the robot 200D and returns to step S101 after the termination.

Back to step S104, when the robot 200D that has started communication holds the work programs PB, PC, that is, when the robot 200D performs the work of transporting the components B, C with the robots 200B, 200C, the work management controller 400A in step S115 terminates the communication with the robot 200D.

Meanwhile, when the robot 200D that has started communication holds the work program. PD in step S104, that is, when the robot 200D does not perform any work, or when the work by the robot 200D as the robot 200A is complete in step S110, the work management controller 400A in steps S116, S117 checks the work plan and checks whether the work of transporting the component A needs assistance by the robot 200D or not. That is, the work management controller 400A checks the presence/absence of a request for the work of transporting the component A made to the robot 200D.

When the work of transporting the component A needs assistance, the work management controller 400A in step S118 requests the robot 200D to perform the work of transporting the component A. Specifically, the work management controller 400A imports the work program PA to the robot 200D. On completion of this step S118, the work management controller 400A goes to the foregoing step S111. Meanwhile, when the work of transporting the component A needs no assistance, the work management controller 400A in step S119 requests the robot 200D to delete the work program PA. Thus, the robot 200D returns to its initial state and operates based on the work program PD. On completion of this step S119, the work management controller 400A in step S115 terminates the communication with the robot 200D.

An example of update processing of the updated work program PAA will now be described with reference to the flowchart shown in FIG. 5.

First, in steps S201, S202, the work management controller 400A checks whether the amount of increase of work data held by the robot 200D operating as the robot 200A exceeds a threshold or not. That is, the work management controller 400A checks whether the amount of increase of uncollected work data exceeds a threshold or not. When the amount of increase of work data is equal to or greater than the threshold, the work management controller 400A in step S203 collects the work data corresponding to the increase and generates the updated work program PAA based on the collected work data.

Then, in step S204, the work management controller 400A imports the generated updated work program PAA to the robot 200D. That is, the work management controller 400A rewrites the work program PA to the latest version. On completion of step S204, or when it is determined in the foregoing step S202 that the amount of increase of work data is less than the threshold, the work management controller 400A in step S205 stops the update processing of the updated work program PAA for a predetermined time until a predetermined amount of work data is accumulated in the robot 200D.

Up to this point, an example of the processing by the work management controller 400A has been described. An example of the processing when the robot 200D is assigned to perform the work of transporting the component A will now be described with reference to the flowchart shown in FIG. 6.

First, in step S301, the robot 200D receives the work program PA imported from the work management controller 400A and starts executing the work program PA. Specifically, first in step S302, the robot 200D moves to a depository of the serving trays T. Next, in step S303, the robot 200D picks up an empty serving tray T by the robot arm 220 and places the serving tray T onto the mounting table 211. Next, in step S304, the robot 200D moves to the box 110A accommodating the components A. Next, in step S305, the robot 200D picks up a component A from the box 110A and sets the component A on the serving tray T. The robot 200D also accumulates work data at this time. This step S305 is repeated until a predetermined number of components A are set on the serving tray T.

Next, in step S306, the robot 200D moves to the work table 120. Next, in step S307, the robot 200D picks up the component A along with the serving tray T by the robot arm 220 and places the serving tray T onto the work table 120.

The foregoing steps S302 to S307 are repeated until the transport of a predetermined number of serving trays T is finished. Thus, the work of transporting the component A ends. Next, in step S308, the robot 200D transmits the accumulated work data to the work management controller 400A in response to a request from the work management controller 400A. At this time, the robot 200D may move to an area where the robot 200D can communicate with the work management controller 400A. Next, in step S309, the robot 200D deletes the transmitted work data in response to a request from the work management controller 400A.

Next, in steps S310, S311, the robot 200D inquires the presence/absence of an additional request from the work management controller 400A. That is, the robot 200D inquires whether to continue executing the transport of the component A or terminate the transport of the component A. When there is an additional request, the robot 200D returns to step S301 and repeats steps S301 to S310. Meanwhile, when there is no additional request, the robot 200D in step S312 deletes the work program PA in response to a request from the work management controller 400A.

Step S305 will now be described further in detail with reference to the flowchart shown in FIG. 7.

First, in step S401, the robot 200D visually recognizes the components A in the box 110A. Next, in step S402, the robot 200D decides one component A to be grasped by the hand 227, based on the result of the visual recognition, and prepares a grasp plan for this. Next, in step S403, the robot 200D grasps the component A in the box 110A by the hand 227, based on the prepared grasp plan. Next, in step S404, the robot 200D checks the grasp state of the component A. Next, in step S405, the robot 200D visually recognizes the serving tray T on the mounting table 211. Next, in step S406, the robot 200D sets the component A grasped by the hand 227 at a predetermined position on the serving tray T, based on the result of the visual recognition. Next, in step S407, the robot 200D saves the work data of steps S401 to S406. The robot 200D repeats the foregoing steps S401 to S407 until a predetermined number of components A are set on the serving tray T. Up to this point, step S305 has been described in detail.

As described above, the program transfer system formed of the work management controller 400A has: the communication unit 410 communicating with the robot 200D and outputting the result of the communication; the determination unit 420 checking the work program held by the robot 200D, based on the result of the communication, and determining whether or not to import the work program PA as a different target work program from this work program; the program import unit 450 importing the work program PA to the robot 200D when the determination unit 420 determines that the work program PA is to be imported to the robot 200D; the collection unit 470 collecting work data of complete work from the robot 200D; and the program update unit 480 performing machine learning using the work data collected by the collection unit 470 and updating the work program PA, based on the result of the machine learning. In such a program transfer system, machine learning is performed using the work data collected from the robot 200D itself, and the work program PA is updated, based on the result of the machine learning. Therefore, the update work is easy and a more appropriate updated work program PAA can be imported to the robot 200D.

As described above, the program update unit 480 performs machine learning using work data collected from the robot 200D and work data collected from another robot 200 than the robot 200D, and updates the work program PA into the updated work program PAA, based on the result of the machine learning. Therefore, a large amount of learning is achieved and the updated work program PAA with higher accuracy can be generated accordingly. Also, the update cycle of the updated work program PAA can be reduced.

As described above, the collection of work data by the collection unit 470 and the update of the work program PA by the program update unit 480 are repeated. Thus, the latest work program PA can be maintained in the robot 200D performing the work of transporting the component A and the work efficiency of this robot 200D is improved.

As described above, the program transfer system has the release unit 440 releasing the memory area in the robot 200D secured (held) by the work program PA. Thus, the robot 200D released from the work of transporting the component A can be assigned to assist other delayed work. This can make the entire work more efficient.

As described above, the program transfer system has the number-of-robots determination unit 430 determining whether the number of robots 200A is enough to perform the work corresponding to the work program PA according to the work plan or not. Having such a number-of-robots determination unit 430 enables accurate determination on whether the number of robots 200A is enough or not.

As described above, the program import unit 450 imports the work program PA to the robot 200D when the number-of-robots determination unit 430 determines that the number of robots 200A is not enough. Thus, the robot 200D can assist the work of transporting the component A and this can increase the efficiency of the work. Also, since the robot 200D can be prevented from assisting the work of transporting the component A when the number of robots 200A is enough, more robots 200D can be made to stand by to assist other work.

As described above, the program transfer system has the work state check unit 460 checking the work state of the robot 200D. Thus, the robot 200D can be controlled more easily.

As described above, the robot system 1 has the robot 200D and the foregoing program transfer system. That is, the robot system 1 has: the robot 200D; the communication unit 410 communicating with the robot 200D and outputting the result of the communication; the determination unit 420 checking the work program held by the robot 200D, based on the result of the communication, and determining whether or not to import the work program PA as a different target work program from this work program; the program import unit 450 importing the work program PA to the robot 200D when the determination unit 420 determines that the work program PA is to be imported to the robot 200D; the collection unit 470 collecting work data of complete work from the robot 200D; and the program update unit 480 performing machine learning using the work data collected by the collection unit 470 and updating the work program PA, based on the result of the machine learning. In such a robot system 1, machine learning is performed using the work data collected from the robot 200D itself, and the work program PA is updated, based on the result of the machine learning. Therefore, the update work is easy and a more appropriate updated work program PAA can be imported to the robot 200D.

Second Embodiment

FIG. 8 is a block diagram showing the configuration of a robot system according to a second embodiment.

This embodiment is similar to the first embodiment except for the arrangement of the work management controllers 400A to 400C. In the description below, this embodiment is described mainly in terms of the difference from the foregoing embodiment and the description of similar matters is omitted. In FIG. 8, components similar to those in the foregoing embodiment are denoted by the same reference signs. The work management controllers 400A to 400C have similar configurations. Therefore, in the description below, the work management controller 400A is described as a representative example and the description of the work management controllers 400B, 400C is omitted for the sake of convenience of the description.

As shown in FIG. 8, in the robot system 1 according to this embodiment, one robot 200A, of a plurality of robots 200A performing the work of transporting the component A, functions as master robot 200A', and the other robot 200A functions as a slave robot 200A" that can communicate with the master robot 200A'. The master robot 200A' has the work management controller 400A.

Specifically, the master robot 200A' has the communication unit 410, the determination unit 420, the number-ofrobots determination unit 430, the release unit 440, the program import unit 450, the work state check unit 460, and the collection unit 470, from among the units forming the work management controller 400A. These units are installed in the master robot 200A'. Meanwhile, the program update unit 480, from among the units forming the work management controller 400A, is not provided in the robot 200D and is held by, for example, a server SV installed at a remote site outside the industrial plant 100 and being able to communicate with the master robot 200A' via the internet, LAN (local area network) or the like. The server SV is formed of a computer. For example, a cloud server, fog server or the like can be used.

Since the work management controller 400A is installed in the master robot 200A' as described above, the work management controller 400A can be moved along with the master robot 200A' inside the industrial plant 100. Therefore, for example, when performing work at a different work site from before, simply moving the master robot 200A' enables the execution of the work with the slave robot 200A" and the robot 200D. The program update unit 480 tends to have a large-sized device configuration in order to process a large amount of data. Therefore, the program update unit 480 is held in the server SV instead of being installed in the master robot 200A'. This can effectively restrain an increase in the size and weight of the master robot 200A'. Also, the server SV has a high degree of freedom in design and therefore its processing capability can be easily enhanced.

As described above, in the program transfer system formed of the work management controller 400A, the communication unit 410, the determination unit 420, and the collection unit 470 are provided in the master robot 200A', which is a different robot from the robot 200D to which the work program PA is imported. Thus, the work management controller 400A can be moved along with the master robot 200A' inside the industrial plant 100. Therefore, for example, when performing work at a different work site from before, simply moving the master robot 200A' enables the execution of the work with the slave robot 200A" and the robot 200D.

As described above, the program update unit 480 is held in the server SV that can communicate with the communication unit 410. The program update unit 480 tends to have a large-sized device configuration in order to process a large amount of data. Therefore, the program update unit 480 is held in the server SV instead of being installed in the master robot 200A'. This can effectively restrain an increase in the size and weight of the master robot 200A'. Also, the server SV has a high degree of freedom in design and therefore its processing capability can be easily enhanced.

The second embodiment can achieve effects similar to those of the first embodiment.

The program transfer system and the robot system according to the present disclosure have been described, based on the illustrated embodiments. However, the present disclosure is not limited to these embodiments. The configuration of each part can be replaced with any configuration having a similar function. Also, any other component may be added. Moreover, any two or more of the configurations in the respective embodiments may be combined together.

What is claimed is:

1. A program transfer system comprising:
   a communication device configured to communicate with a plurality of robots and output a communication result;
   a memory configured to store a program; and
   a processor configured to execute the program so as to:
   determine a current work program provided in the plurality of robots based on the communication result;
   determine whether a target work program is imported into the plurality of robots based on the determined current work program;
   determine whether a number of the plurality of robots is appropriate to perform target work corresponding to the target work program according to a work plan;
   import the target work program into the plurality of robots when the processor determines that the target work program is imported into the plurality of robots and that the number of the plurality of robots is inappropriate to perform the target work under the determined current work program;
   collect work data of completed work performed by the plurality of robots using the current work program;
   perform machine learning using the collected work data to generate a machine learning result; and
   update the target work program based on the machine learning result.

2. The program transfer system according to claim 1, further comprising:
   a master robot that is different from the plurality of robots,
   wherein the processor is configured with a first processor and a second processor, and the first processor performs the importing of the target work program into the plurality of robots, and
   the master robot includes the communication device and the second processor.

3. The program transfer system according to claim 2, further comprising:
   a server,
   wherein the server includes the first processor, and the first processor is configured to communicate with the communication device.

4. The program transfer system according to claim 1, wherein the processor is configured to repeat the collecting of the work data of the completed work, the performing of the machine learning, and the updating of the target work program.

5. The program transfer system according to claim 1, wherein the processor is further configured to release a memory area in the plurality of robots held by the target work program.

6. The program transfer system according to claim 1, wherein the processor is further configured to check a work state of the plurality of robots.

7. A robot system comprising:
   a plurality of robots; and
   a program transfer system, the program transfer system including:
   a communication device configured to communicate with the plurality of robots and output a communication result;
   a memory configured to store a program; and
   a processor configured to execute the program so as to:
   determine a current work program provided in the plurality of robots based on the communication result;
   determine whether a target work program is imported into the plurality of robots based on the determined current work program;
   determine whether a number of the plurality of robots is appropriate to perform target work corresponding to the target work program according to a work plan;

import the target work program into the plurality of robots when the processor determines that the target work program is imported into the plurality of robots and that the number of the plurality of robots is inappropriate to perform the target work under the determined current work program;

collect work data of completed work performed by the plurality of robots using the current work program;

perform machine learning using the collected work data to generate a machine learning result; and update the target work program based on the machine learning result.

8. The robot system according to claim 7, further comprising:

a master robot that is different from the plurality of robots, wherein the processor is configured with a first processor and a second processor, and the first processor performs the importing of the target work program into the plurality of robots, and the master robot includes the communication device and the second processor.

9. The robot system according to claim 8, further comprising:

a server, wherein the server includes the first processor, and the first processor is configured to communicate with the communication device.

10. The robot system according to claim 7, wherein the processor is configured to repeat the collecting of the work data of the completed work, the performing of the machine learning, and the updating of the target work program.

11. The robot system according to claim 7, wherein the processor is further configured to release a memory area in the plurality of robots held by the target work program.

12. The robot system according to claim 7, wherein the processor is further configured to check a work state of the plurality of robots.

* * * * *